(12) United States Patent
Kawagoe et al.

(10) Patent No.: US 6,212,453 B1
(45) Date of Patent: Apr. 3, 2001

(54) VEHICLE STEERING CONTROL SYSTEM

(75) Inventors: Hiroyuki Kawagoe; Shinnosuke Ishida, both of Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/393,963

(22) Filed: Sep. 10, 1999

(30) Foreign Application Priority Data

Sep. 11, 1998 (JP) ................................. 10-276604

(51) Int. Cl.$^7$ ............................. B62D 5/04; B62D 6/00
(52) U.S. Cl. ........................... 701/41; 180/443; 701/28
(58) Field of Search ............................. 701/41, 42, 28, 701/36; 180/443, 446, 422, 168; 340/937, 938, 939; 318/580

(56) References Cited

U.S. PATENT DOCUMENTS

| | | | |
|---|---|---|---|
| 4,834,203 | * | 5/1989 | Takahashi et al. .................. 180/79.1 |
| 5,481,457 | * | 1/1996 | Yamamoto et al. ............. 364/424.05 |
| 5,845,222 | * | 12/1998 | Yamamoto et al. .................... 701/41 |
| 5,913,375 | * | 6/1999 | Nishikawa ........................... 180/168 |
| 5,925,082 | * | 7/1999 | Shimizu et al. ...................... 701/41 |

FOREIGN PATENT DOCUMENTS

| | | |
|---|---|---|
| 5-197423 | 8/1993 | (JP) . |
| 9-221054 | 8/1997 | (JP) . |
| 11-78948 | 3/1999 | (JP) . |

\* cited by examiner

Primary Examiner—Tan Nguyen
Assistant Examiner—Dalena Tran
(74) Attorney, Agent, or Firm—Arent Fox Kintner Plotkin & Kahn, PLLC

(57) ABSTRACT

A system for controlling steering of a vehicle, including an electric motor used for power-steering torque assist control. In the system, the lane-keeping-steering assist torque TLK for causing the vehicle to run along the center of a road existing ahead of the vehicle is calculated, while the power-steering assist torque TPS for assisting the vehicle driver's steering is calculated. Then, ratios RTO1 and RTO2 are calculated based on the detected steering torque. The assist torques TLK, TPS are corrected by multiplication with the ratios RTO1, RTO2 respectively and are added together to determine a final assist torque TA, and based on the final assist torques TA, a motor current to be supplied to the electric motor is determined, thereby enabling to effectively prevent the two kinds of control from interfering with each other so as not to adversely affect the vehicle driver's perception of vehicle steering response. Additional ratios are determined based on the detected steering torque change and the vehicle speed.

10 Claims, 12 Drawing Sheets

VEHICLE STEERING CONTROL SYSTEM

BACKGROUND OF THE INVENTION

1. Field of the Invention

This invention relates to a vehicle steering control system.

2. Description of the Related Art

Prior art references proposed by the assignee, including those made public by Japanese Laid-Open Patent Application Nos. Hei 5(1993)-197423 and Hei 9(1997)-221054, teach vehicle steering control system technologies that provide steering angle assistance for keeping the vehicle on a desired course of travel along a lane of a road.

By providing fine steering assistance while preventing vehicle lane wandering, these technologies greatly reduce the burden on the vehicle driver, which tends to increase particularly during long, high-speed driving on an expressway or the like.

In view of the interference or interaction between this type of steering assistance control and vehicle driver steering, the control should preferably be effected to provide assistance through torque (steering force) rather than steering angle.

However, when a lane-keeping-steering torque assist control of such type is conducted using an actuator such as an electric motor of a conventional power-steering torque assist control system such that both the lane-keeping-steering torque assist control and the power-steering torque assist control are conducted using the same actuator, there may be a case when the two kinds of control interfere with each other, thereby affecting the vehicle driver's perception of vehicle steering response.

SUMMARY OF THE INVENTION

An object of this invention is therefore to provide a vehicle steering control system which conducts the lane-keeping-steering torque assist control by using an actuator such as an electric motor of a conventional power-steering torque assist control system such that both the lane-keeping-steering torque assist control and the power-steering torque assist control are conducted using the same actuator, while effectively preventing the two kinds of control from interfering with each other so as not to adversely affect the vehicle driver's perception of vehicle steering response.

In order to achieve this object, there is provided a system for controlling steering of a vehicle, including: an actuator which steers driven wheels of the vehicle; 1st assist torque calculating means for calculating a first assist torque for causing the vehicle to run along a reference line of a road existing ahead of the vehicle; steering torque detecting means for detecting a steering torque inputted by a vehicle driver of the vehicle; 2nd assist torque calculating means for calculating a 2nd assist torque for assisting vehicle driver's steering of the vehicle in accordance with a predetermined characteristic based on the detected steering torque; manipulated variable calculating means for calculating a manipulated variable to be supplied to the actuator based on the calculated 1st and 2nd assist torques; assist torque correcting means for correcting the calculated 1st and 2nd assist torques based on at least the detected steering torque; and manipulated variable calculating means for calculating a manipulated variable to be supplied to the actuator based on the corrected 1st and 2nd assist torques.

BRIEF EXPLANATION OF THE DRAWINGS

This and other objects and advantages of the invention will be more apparent from the following description and drawings, in which.

DETAILED DESCRIPTION OF THE PREFERRED EMBODIMENTS

An embodiment of the invention will now be explained with reference to the attached drawings.

Figure 1:
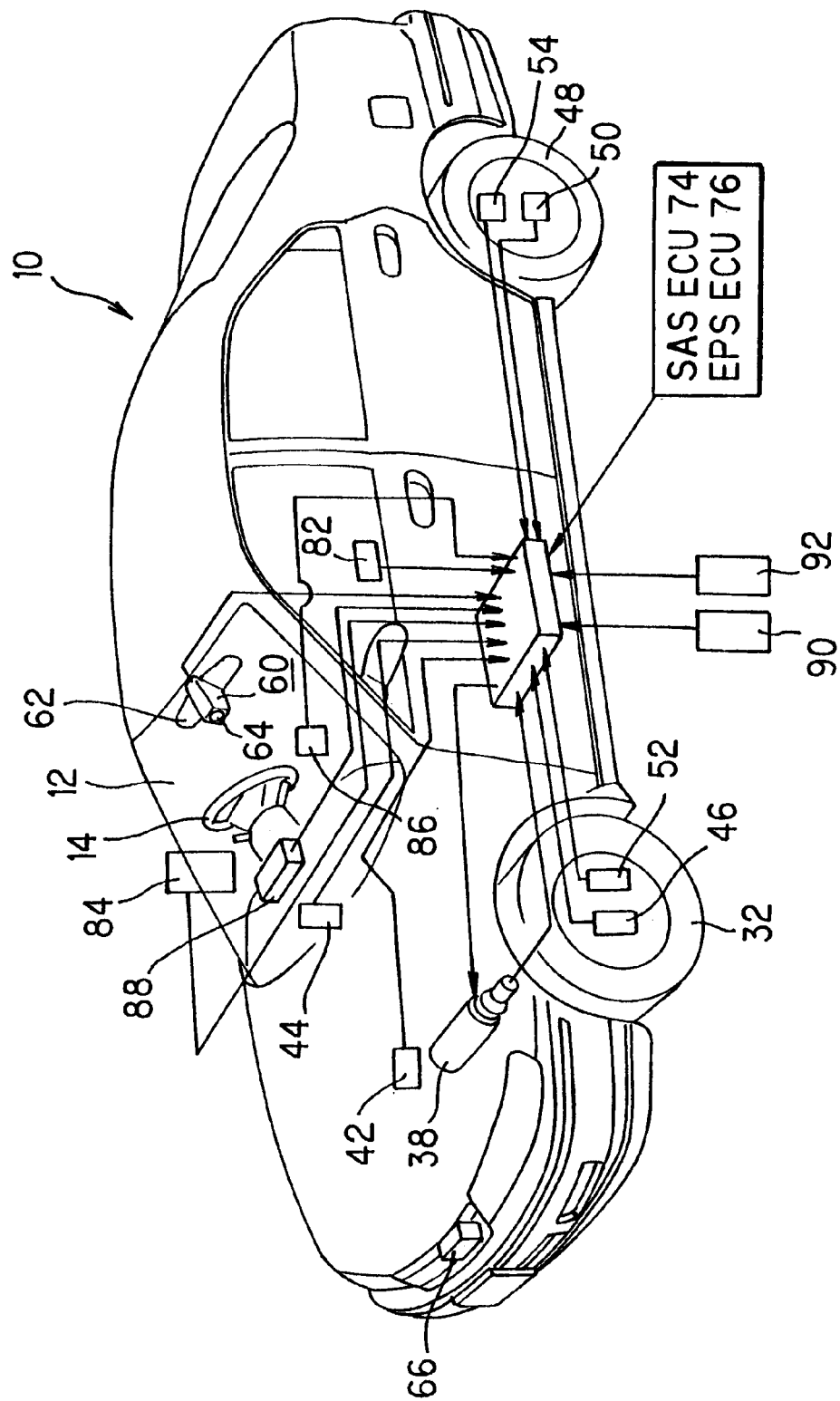
FIG. 1 is an overall schematic view showing the overall configuration of a vehicle steering control system according to the present invention.
Figure 2:
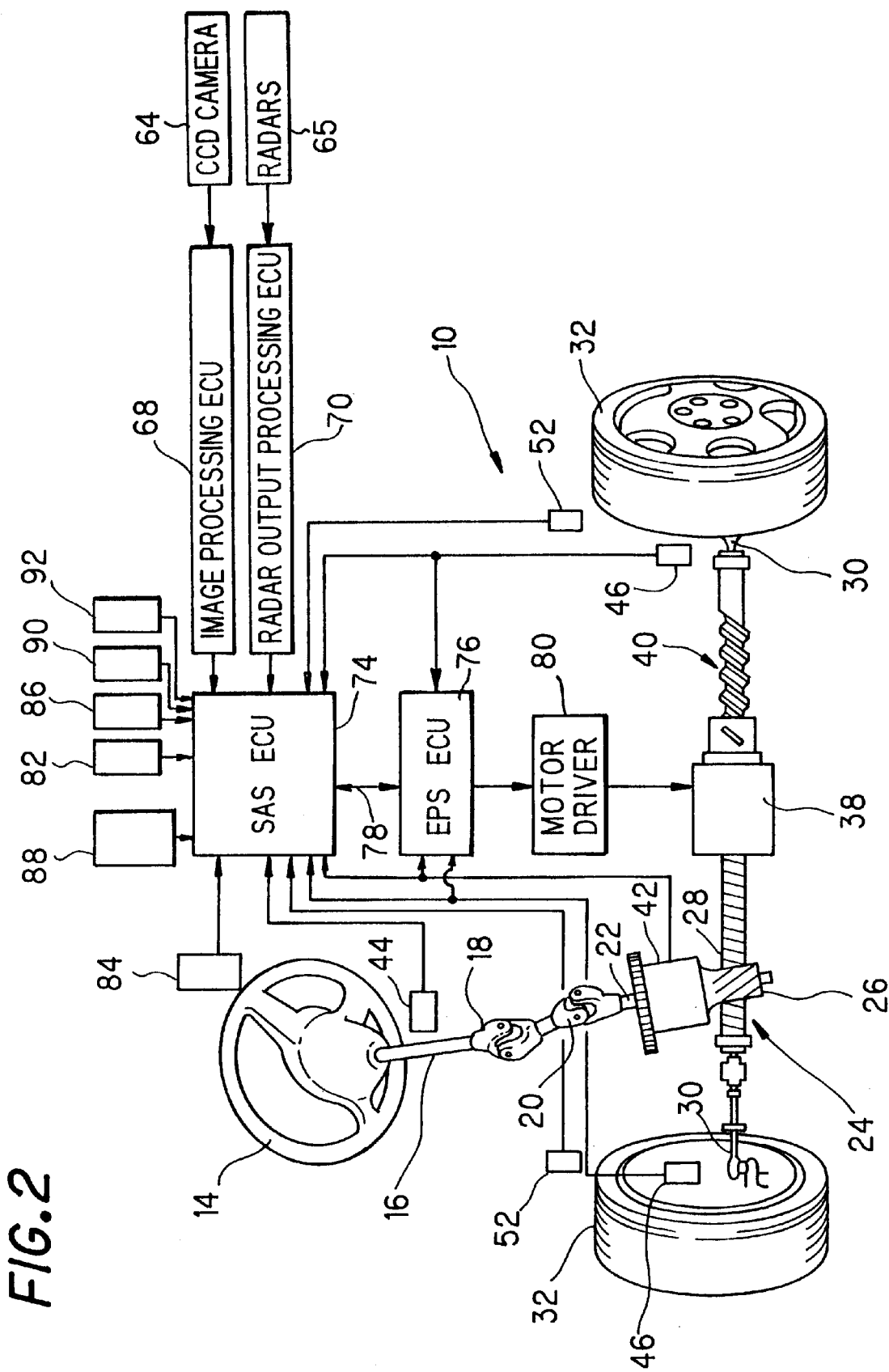
FIG. 2 is an explanatory view showing the configuration of a steering mechanism illustrated in FIG. 1.

FIG. 1 is an overall schematic view of a vehicle steering control system according to the present invention. FIG. 2 is an explanatory view of the system with particular focus on the steering mechanism.

As shown in FIGS. 1 and 2, a steering wheel 14 located at the vehicle driver's seat 12 of a vehicle 10 is connected to a steering shaft 16 that is in turn connected through universal joints 18, 20 to a connecting shaft 22.

The connecting shaft 22 is connected to a pinion 26 of a rack-and-pinion steering gear assembly 24. The pinion 26 is engaged with a rack 28. Rotary motion inputted from the steering wheel 14 by the vehicle driver passes through the pinion 26 to be converted into linear motion of the rack 28. The linear motion passes through tie rods (steering rods) 30, 30 at the opposite ends of the front axle to turn two front wheels (steered wheels) 32, 32 in the desired direction around the associated king pins (not shown).

An electric motor 38 and a ball-screw mechanism 40 are disposed coaxially with the rack 28. The output of the motor 38 is converted into linear motion of the rack 28 by a ball-screw mechanism 40 so as to move the rack 28 in the direction that reduces or assists the steering force (steering torque) inputted through the steering wheel 14 by the vehicle driver.

A torque sensor 42 provided in the vicinity of the rack-and-pinion steering gear 24 outputs a signal indicating the direction and magnitude of the steering force (steering torque) inputted by the vehicle driver. A steering angle sensor 44 provided in the vicinity of the steering shaft 16 outputs a signal indicating the direction and magnitude of the steering angle inputted by the vehicle driver. The steering angle sensor 44 is a rotary encoder or the like.

Wheel speed sensors 46, 46 situated in the vicinity of each of the front wheels 32, 32 and wheel speed sensors 50, 50 (FIG. 1; only one shown) situated in the vicinity of each of two rear wheels 48, 48 (only one shown), output signals once every predetermined angle of rotation of the associated front and rear wheels. The wheel speed sensors 46, 46 and 50, 50 are magnetic pickups or the like. The front wheels 32, 32 are driven wheels powered by an engine (not shown) mounted at the front of the vehicle 10. The rear wheels 48, 48 are idle.

A vehicle height sensor 52 is provided in the vicinity of the suspension mechanism (not shown) of each front wheel 32 and a vehicle height sensor 54 is provided in the vicinity of the suspension mechanism (not shown) of each rear wheel 48. Based on the stroke (displacement) of the associated suspension mechanism, each height sensor outputs a signal indicating the height of the vehicle 10 at the sensor location.

As shown in FIG. 1, a single monocular CCD (Charge-Coupled Device) camera 64 combined with rear-view mirror 62 is attached to the inner surface of the windshield 60 above the vehicle driver's seat 12. Multiple radars 66 (operative in millimeter-wave; only one radar shown in FIG. 1) are provided at appropriate locations including that near the front bumper of the vehicle 10 and emit modulated waves to the front.

The CCD camera 64 is dedicated to photo-senses and outputs an image signal of the road ahead of the vehicle 10. As shown in FIG. 2, the image signal outputted by the CCD camera 64 is forwarded to an image processing ECU (Electronic Control Unit) 68, comprised of a microcomputer, that extracts the lane boundaries (white lines) painted on the road from the image signal. The outputs of the millimeter-wave radar 66 are forwarded to a radar output processing ECU 70, also comprised of a microcomputer, where they are mixed with a received wave obtained through an antenna (not shown) and used to discriminate whether or not a solid object such as another vehicle is located ahead of the vehicle 10.

The vehicle steering control system according to the present invention also has an Electronic Control Unit (shown as "SAS ECU") 74, also comprised of a microcomputer. The outputs of the image processing ECU 68, the radar output processing ECU 70 and the torque sensor 42 etc., are inputted to the SAS ECU 74.

The system is also equipped with a second Electronic Control Unit (shown as "EPS ECU") 76 also comprised of a microcomputer. The outputs of the torque sensor 42 and the wheel speed sensor 46, etc., are inputted to the EPS ECU 76.

The SAS ECU 74 and the EPS ECU 76 can communicate with each other through a signal line 78. The SAS ECU 74 calculates the lane-keeping-steering assist torque as explained later and forwards the same to the EPS ECU 76.

The EPS ECU 76 calculates the power-steering assist torque and based on the calculated power-steering assist torque and the forwarded lane-keeping-steering assist torque, calculates a final steering assist torque. Then, based on the calculated final steering assist torque, it calculates or determines a manipulated variable (motor current) to be supplied to the electric motor 38.

The EPS ECU 76 is connected to a motor driver 80. The motor driver 80 is equipped with a known bridge circuit (not shown) composed of four power FET switching devices, the on/off state of which determines the direction in which the electric motor will drive.

The EPS ECU 76 calculates or determines the motor current (manipulated variable) in duty ratio in terms of PWM (pulse-width modulation) and outputs it to the motor driver 80. Thus, the EPS ECU 76 duty-ratio controls the FET switching devices to regulate the motor current such that the electric motor 38 generates the required assist torque.

A yaw rate sensor 82 is installed at a location near the center of gravity of the vehicle 10. The yaw rate sensor 82 outputs a signal indicating the yaw rate (angular velocity of yaw) around the vertical axis (the axis of gravity) at the center of gravity of the vehicle 10.

An appropriate number of tactile pressure sensors 84 provided on the steering wheel 14 output pressure signals indicating whether or not the vehicle driver is manipulating the steering wheel 14. An appropriate number of second tactile pressure sensors 86 installed under the vehicle driver's seat output signals indicating whether or not the vehicle driver is seated.

Moreover, this system is equipped with a navigation system 88. The navigation system 88 has a CPU (not shown), a CD ROM (not shown) which stores the navigation information including the road map of places where the vehicle 10 is expected to travel, the directional information on the road map, etc., and a GPS (Global Positioning System) receiver (not shown) which receives the signal from the GPS satellite position system and detects the instantaneous position of the vehicle 10.

A brake switch 90 associated with the brake pedal (not shown) near the floor at the vehicle driver's seat 12 outputs a signal indicating the depression of the brake pedal by the vehicle driver. An accelerator position sensor 92 associated with the accelerator pedal (not shown) outputs a signal indicating the amount of depression of the accelerator pedal by the vehicle driver.

In the below, the lane-keeping-steering torque assist control and the power-steering torque assist control according to the system proposed earlier by the assignee will be explained.

As mentioned above, in view of the interference or interaction between this type of steering assistance control and vehicle driver steering, the lane-keeping-steering torque assist control should preferably be effected to provide assistance through torque (steering force) rather than steering angle. Moreover, if the system is configured to use the actuator (electric motor 38) for power-steering torque assist control for this purpose, the system can advantageously be made simple.

For that reason, the assignee proposes, in Japanese Laid-Open Patent Application No. Hei 11(1999)-78948, a vehicle steering control system which conducts the lane-keeping-steering torque assist control and the power-steering torque assist control with the use of the same actuator (the electric motor 38).

Figure 3:
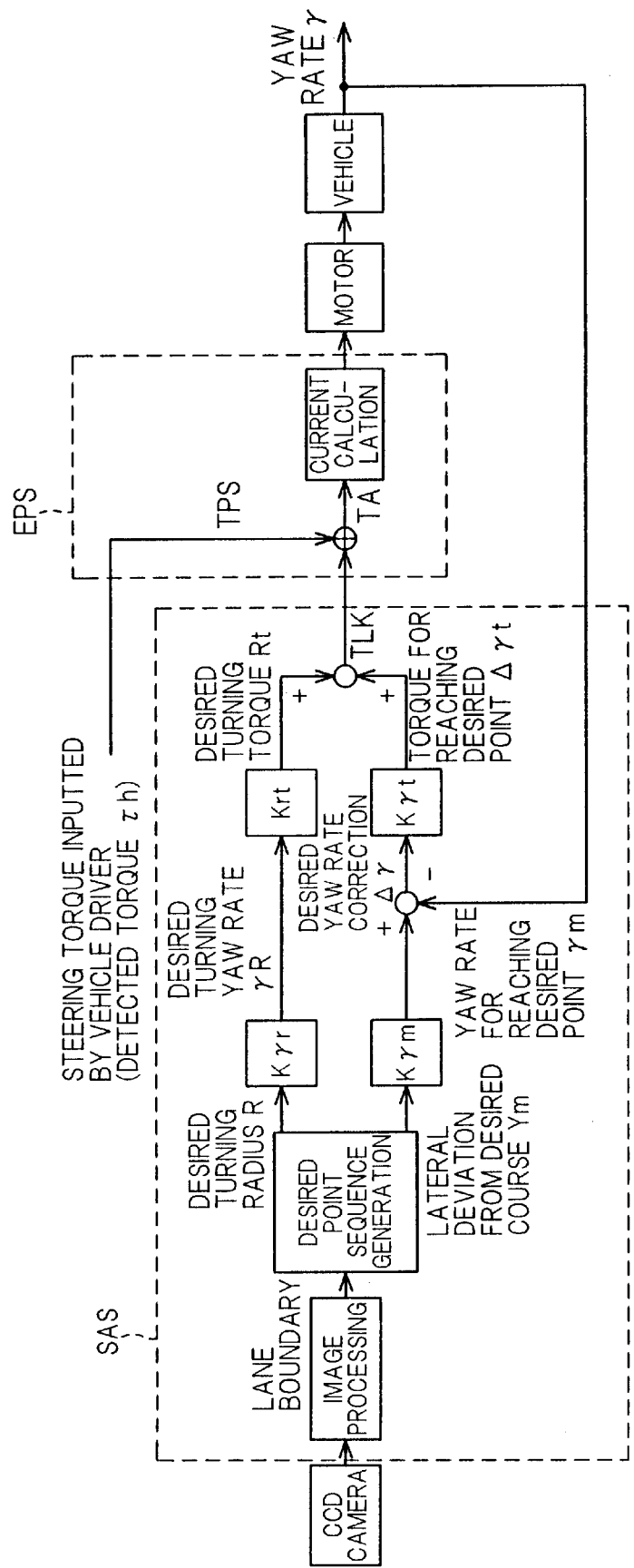
FIG. 3 is a block diagram showing functionally the operation of an SAS ECU and an EPS ECU illustrated in FIG. 2 in the vehicle steering control system proposed earlier by the assignee.
Figure 4:
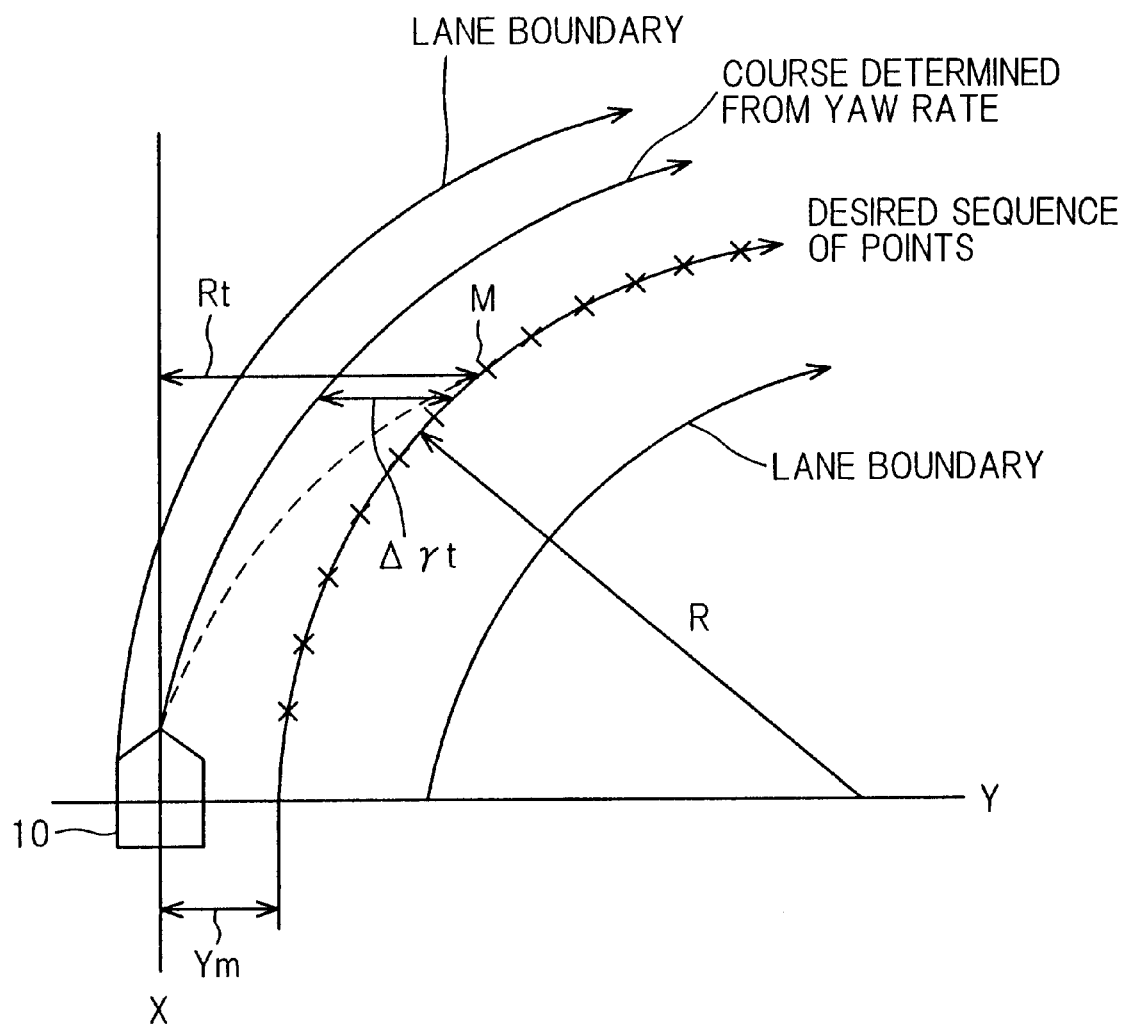
FIG. 4 is an explanatory view showing the coordinate system whose origin is set at the vehicle for explaining the operation of the SAS ECU illustrated in FIG. 3.

FIG. 3 is a block diagram showing that configuration of the vehicle steering control system proposed earlier and FIG. 4 is an explanatory view showing the coordinate system (whose origin is set at the vehicle 10) for explaining the operation of control illustrated in the block diagram of FIG. 3. In FIG. 3, the block illustrated as "SAS" shows the configuration of control carried out by the SAS ECU 74, while the block illustrated as "EPS" shows that carried out by the EPS ECU 76.

The operation of the vehicle steering control system proposed earlier will be explained in brief.

As illustrated in FIG. 3, the SAS ECU 74 determines the lane-keeping-steering assist torque such that the vehicle 10 runs along the center of a lane defined by lane boundaries as shown in FIG. 4.

Specifically, a desired sequence of points is determined at the center of a lane from the lane boundaries obtained by image processing the output of the CCD camera 64 in the image processing ECU 68. A lateral deviation from desired course Ym (i.e., deviation from the lane center) and a desired turning radius R are calculated from the vehicle position relative to the desired sequence of points.

Then, a yaw rate necessary for reaching a desired point γm is calculated based on the calculated lateral deviation from desired course Ym and based on the difference (desired yaw rate correction) Δγ between calculated yaw rate γm and the detected yaw rate γ, a torque necessary for reaching the desired point Δγt is calculated. At the same time, a desired turning yaw rate γR is calculated from the desired turning radius R and based on the calculated desired turning yaw rate γR, a desired turning torque Rt is calculated. The calculated torques Δγt and Rt are added together and the sum is multiplied by a gain (not shown in the figure but determined based on estimated condition of the vehicle 10) to determine or calculate the lane-keeping-steering assist torque TLK (hereinafter referred to as "assist torque TLK").

Here, if the steering torque τh is detected, in other words, if the steering torque is inputted by the vehicle driver, the EPS ECU 76 multiplies the detected torque τh by a gain (not shown in the figure) and determines the product as the power-steering assist torque (hereinafter referred to as "assist torque TPS").

Figure 5:
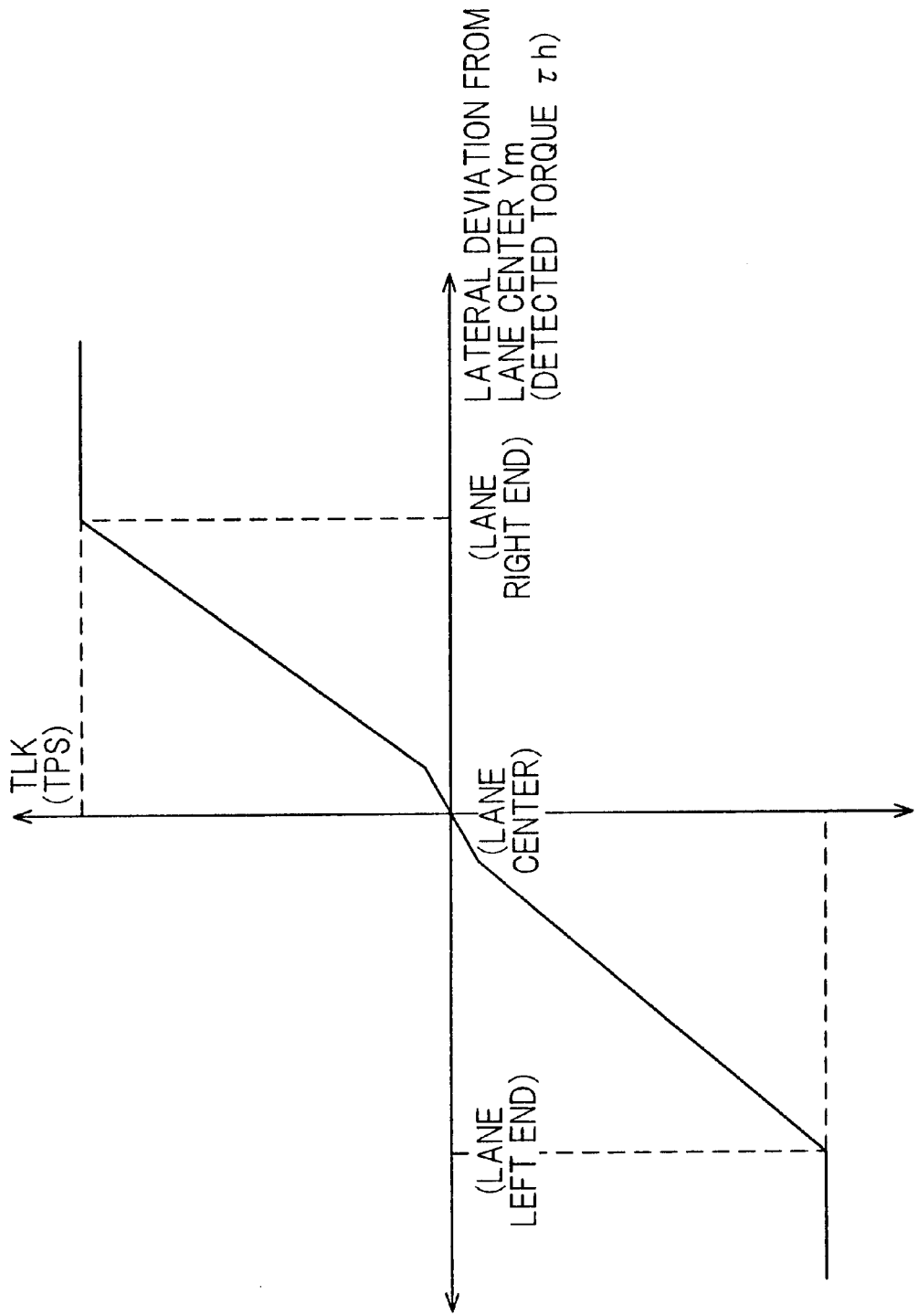
FIG. 5 is a graph showing the characteristic of steering assist torque determined by the SAS ECU or the EPS ECU illustrated in FIG. 3.

FIG. 5 is an explanatory graph illustrating the characteristic of the assist torque TLK or TPS. In the controls illustrated in FIG. 3, the assist torque TLK or TPS is generated in response to the lateral deviation from the lane center (desired course) Ym or the detected torque τh, as shown in FIG. 5.

As mentioned above, the EPS ECU 76 adds the assist torque TPS (when calculated) to the assist torque TLK sent from the SAS ECU 74 and determines the sum as a final steering assist torque TA (referred to hereinafter as "final assist torque TA"). The EPS ECU 76 determines or calculates a motor current based on the final assist torque TA and supplies the current to the electric motor 38 through the motor driver 80 to drive the motor 38.

Thus, the two kinds of assist torques TLK, TPS are simply added together in the control system proposed earlier. Since, however, only one electric motor 38 is used for the double purposes, the two kinds of control may sometimes interfere with each other.

To be more specific, when the lane-keeping-steering torque assist control is in progress, the vehicle driver can enjoy running along the center of lane using only a light touch to the steering wheel 16. Since the torque inputted by the vehicle driver (i.e., the detected torque) is slight, the power-steering torque assist control is not carried out and hence, no control interference will occur.

However, if the vehicle driver inputs an increased amount of torque for example, to avoid an obstacle on the road or to change lanes etc, this causes the introduction of the assist torque TPS. The produced torque TPS may occasionally interfere with the assist torque TLK, disadvantageously affecting the vehicle driver's perception of how the vehicle steering is responding.

Therefore, the object of the present invention is to provide a vehicle steering control system which can effectively prevent the two kinds of control from interfering with each other so as not to adversely affect the vehicle driver's perception of vehicle steering response.

Figure 6:
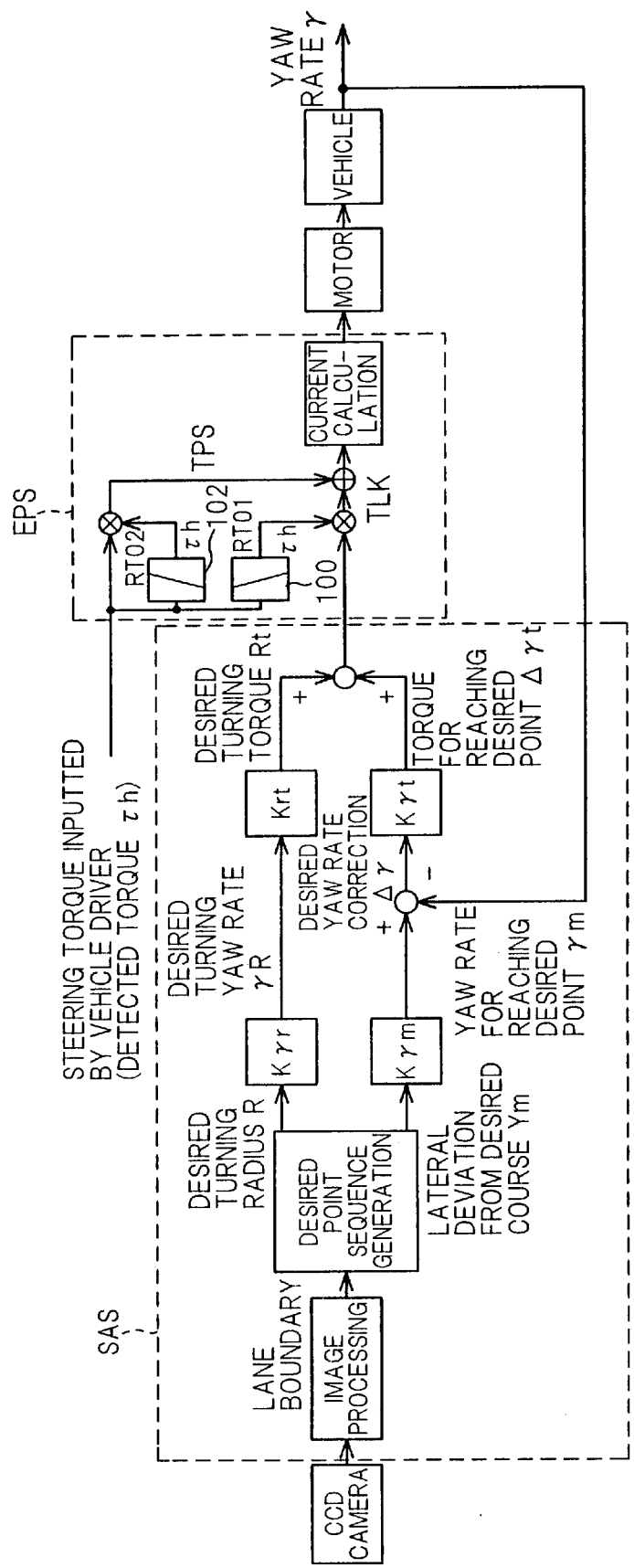
FIG. 6 is a view, similar to FIG. 3, but showing the operation of the vehicle steering control system according to the present invention.

In view of the above, in the vehicle steering control system according to the present invention, the configuration illustrated in FIG. 3 is modified as illustrated in FIG. 6.

Figure 7:
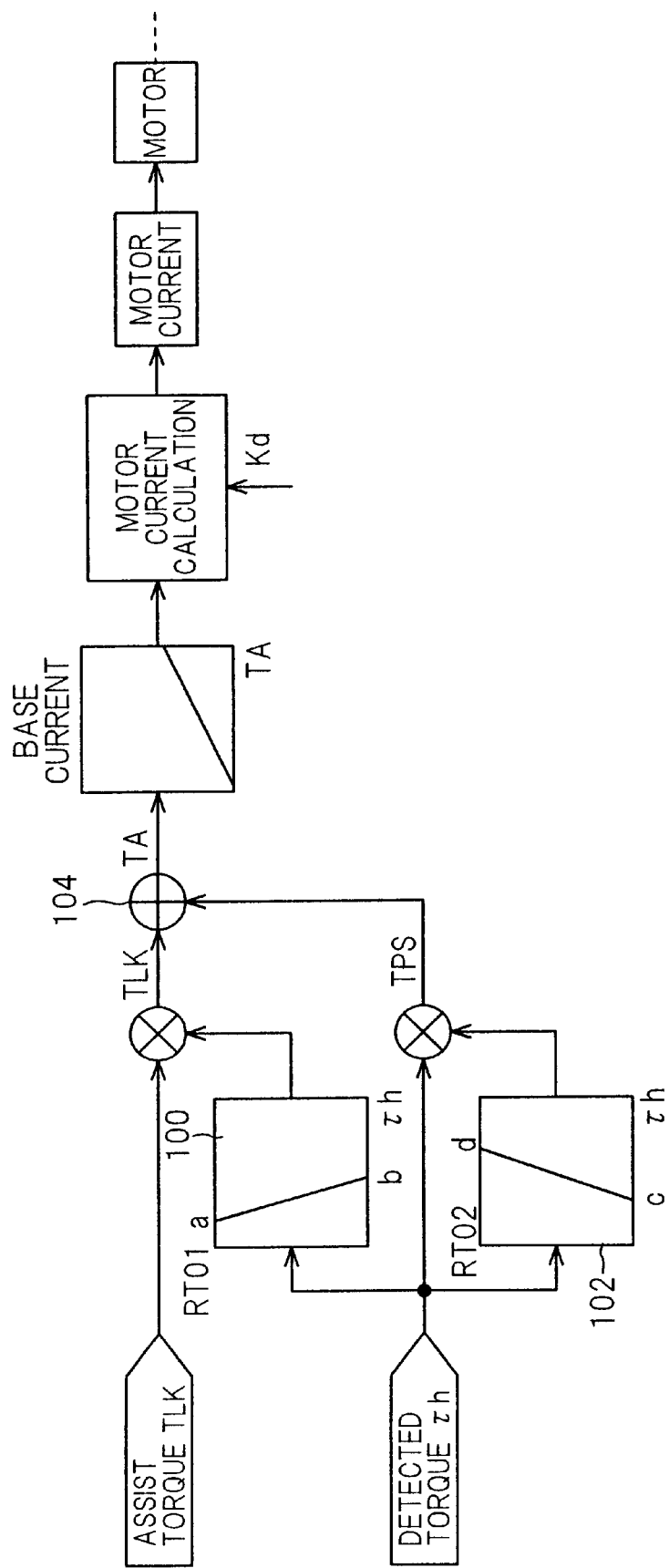
FIG. 7 is a block diagram showing a portion of assist torque correction in detail illustrated in FIG. 6.
Figure 8:
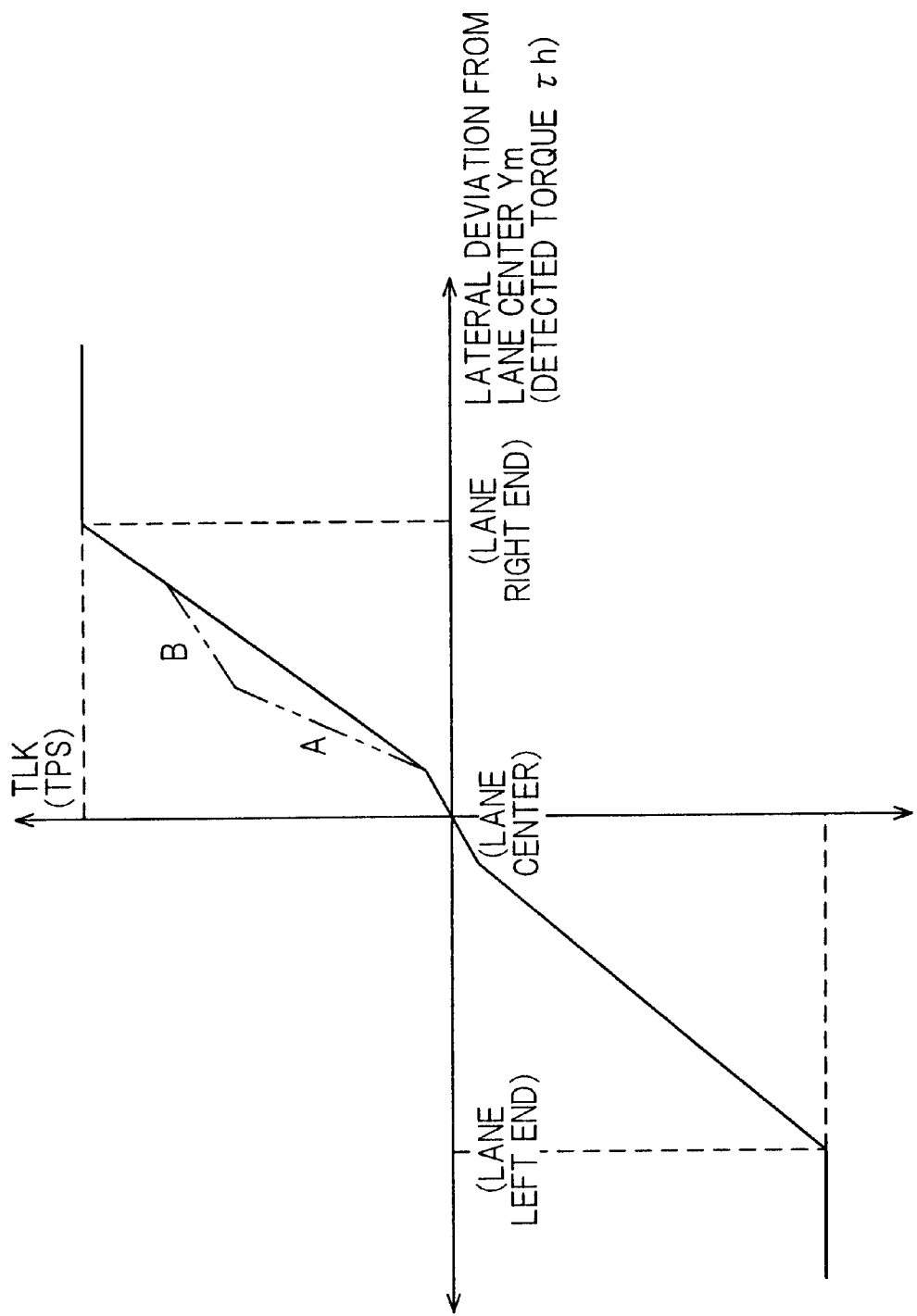
FIG. 8 is a view, similar to FIG. 5, but showing the characteristic of steering assist torque determined by the SAS ECU or EPS ECU illustrated in FIG. 6.

FIG. 7 is a block diagram showing the modified portion in detail, and FIG. 8 is an explanatory graph, similar to FIG. 5, but showing the characteristic of assist torque obtained in the modified configuration.

Explaining the configuration of the vehicle steering control system according to the present invention mainly referring to FIG. 7, a first ratio (correction coefficient) RTO1 is calculated in accordance with a characteristic 100, based on the detected torque τh such that the assist torque TLK is corrected by being multiplied with the calculated ratio RTO1. The ratio RTO1 is calculated as a value ranging from 0 to 1.0.

Similarly, a second ratio (correction coefficient) RTO2 is calculated in accordance with a characteristic 102, based on the detected torque τh such that the assist torque TPS is corrected by being multiplied with the calculated ratio RTO2.

Then, the corrected assist torques TLK, TPS are added together at an addition point 104 to calculate the final assist torque TA. Based on the calculated final assist torque TA, a base current (in duty-ratio in Pulse Width Modulation) is calculated and a dumping-correction factor Kd, etc., is added to or subtracted from the base current to determine the motor current (manipulated variable) which is supplied to the electric motor 38 through the motor driver 80.

As will be understood from FIG. 7, the characteristics 100 and 102 are set to be complementary or inversely proportionate to each other. In other words, the ratio RTO1 is 1.0 at a point a in the characteristic 100, but decreases therefrom with increasing detected torque τh and becomes 0 at a point b. Accordingly, the assist torque TLK decreases from the point a and reaches zero at the point b. In the characteristic 102, on the other hand, the ratio RTO2 is 0 at a point c, but increases therefrom with increasing detected torque τh and becomes 1.0 at a point d. Thus, when the detected torque τh increases beyond the point b, TPS is the only assist torque that forms the final assist torque TA.

Thus, in the control system according to the present invention, the assist torques TLK and TPS are not simply added together. Rather, they are distributed by the ratios RTO1 and RTO2 such that the assist torques TLK and TPS are canceled with each other. As a result, if the power-steering torque assist control is carried out when the lane-keeping-steering torque assist control is in progress, the two kinds of control do not interfere with each other, therefore avoiding any adverse effect upon the vehicle driver's perception of vehicle steering response.

Specifically, the ratios RTO1, 2 are set such that they can prevent the interference between the two kinds of control from happening and in addition, they satisfy required characteristic of assist torque, more specifically, as illustrated in FIG. 8, they satisfy the characteristic of assist torque TPS required in the power-steering torque assist control. In FIG. 8, the assist torque characteristics, more specifically, the assist torque characteristic of TPS has a characteristic portion A and a characteristic portion B (both shown by phantom lines) such that, for a given change in detected torque τh, the amount of assist torque TPS determined in accordance with the characteristic portion B is less than that determined in accordance with the characteristic portion A (same as that later explained in a fourth embodiment as detected torque change $\Delta\tau h$).

Explaining this, the inventors have found, through experimentation that, setting the assist torque obtained in accordance with the characteristic portion A defined for a relatively small detected torque, less than that obtained in accordance with the characteristic portion B defined for a relatively greater detected torque, in other words, making the steering light when the detected torque is relatively small, while making the steering heavier with increasing detected torque, better matches the vehicle driver's perception of how the vehicle ought to respond. Saying this in other words, the inventors have found that setting the characteristic in a convex form with respect to the detected torque as shown in FIG. 8 leads to an improved steering response as perceived by the vehicle driver.

In order to achieve the characteristic having the portions A, B illustrated in FIG. 8, the inventors use the ratios (correction coefficients) RTO1, 2 calculated based on the detected torque such that the assist torque TLK is corrected by multiplication with the ratio RTO1, while the detected torque is multiplied by the calculated ratio RTO2 to determined the assist torque TPS, and the final assist torque TA is determined by adding the assist torques TLK, TPS together. With this, the system results in an improved steering response as perceived by the vehicle driver.

Figure 9:
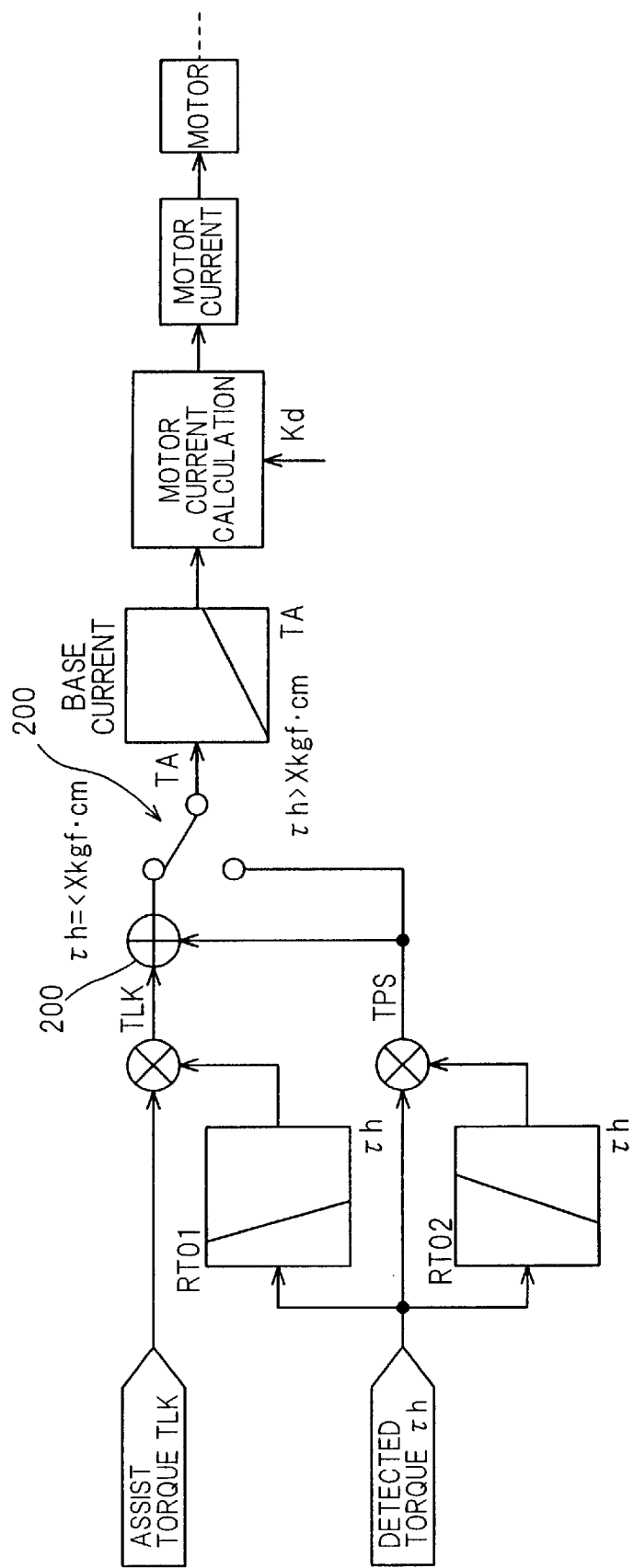
FIG. 9 is a view, similar to FIG. 7, but showing the operation of the vehicle steering control system according to a second embodiment of the present invention.

FIG. 9 is a view, similar to FIG. 7, but showing the configuration of the vehicle steering control system according to a second embodiment of the present invention.

Explaining the configuration with focus on the difference from the first embodiment, a switch 202 is added at a location downstream of an addition point 200 in the second embodiment such that, if the detected torque $\tau h$ is less than or equal to a predetermined value X (e.g., 35 kgf·cm), the final assist torque TA is determined in the same manner as that of the first embodiment. The system is configured, on the other hand, if the detected torque $\tau h$ becomes greater than the predetermined value X, the assist torque TA is only determined from the assist torque TPS. In the case when the detected torque becomes greater than the predetermined value X, it is assumed that the vehicle driver would not want the lane-keeping-steering assist torque, rather he would wish only the power-steering assist torque. The rest of the configuration as well as the advantages are the same as those of the first embodiment.

Figure 10:
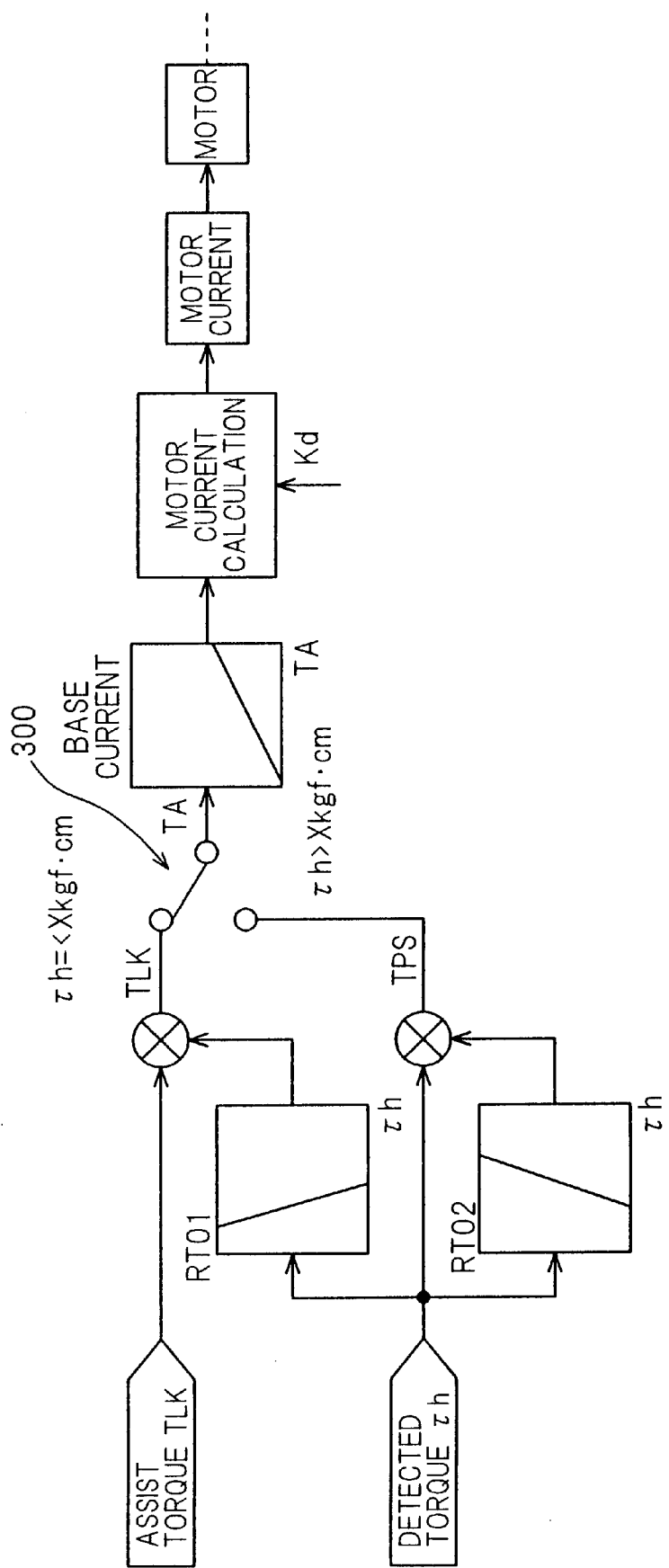
FIG. 10 is a view, similar to FIG. 7, but showing the operation of the vehicle steering control system according to a third embodiment of the present invention.

FIG. 10 is a view, similar to FIG. 7, but showing the configuration of the vehicle steering control system according to a third embodiment of the present invention.

Explaining the configuration with focus on the difference from the first embodiment, removing the addition point, a switch 300 is provided in the third embodiment such that, when the detected torque $\tau h$ is less than or equal to the predetermined value X (e.g., 35 kgf·cm), the assist torque TA is determined based upon only the assist torque TLK, while, if the detected torque is greater than the predetermined value X, the assist torque TA is determined solely from the assist torque TPS. The rest of the configuration as well as the advantages are similar to those of the first embodiment.

Figure 11:
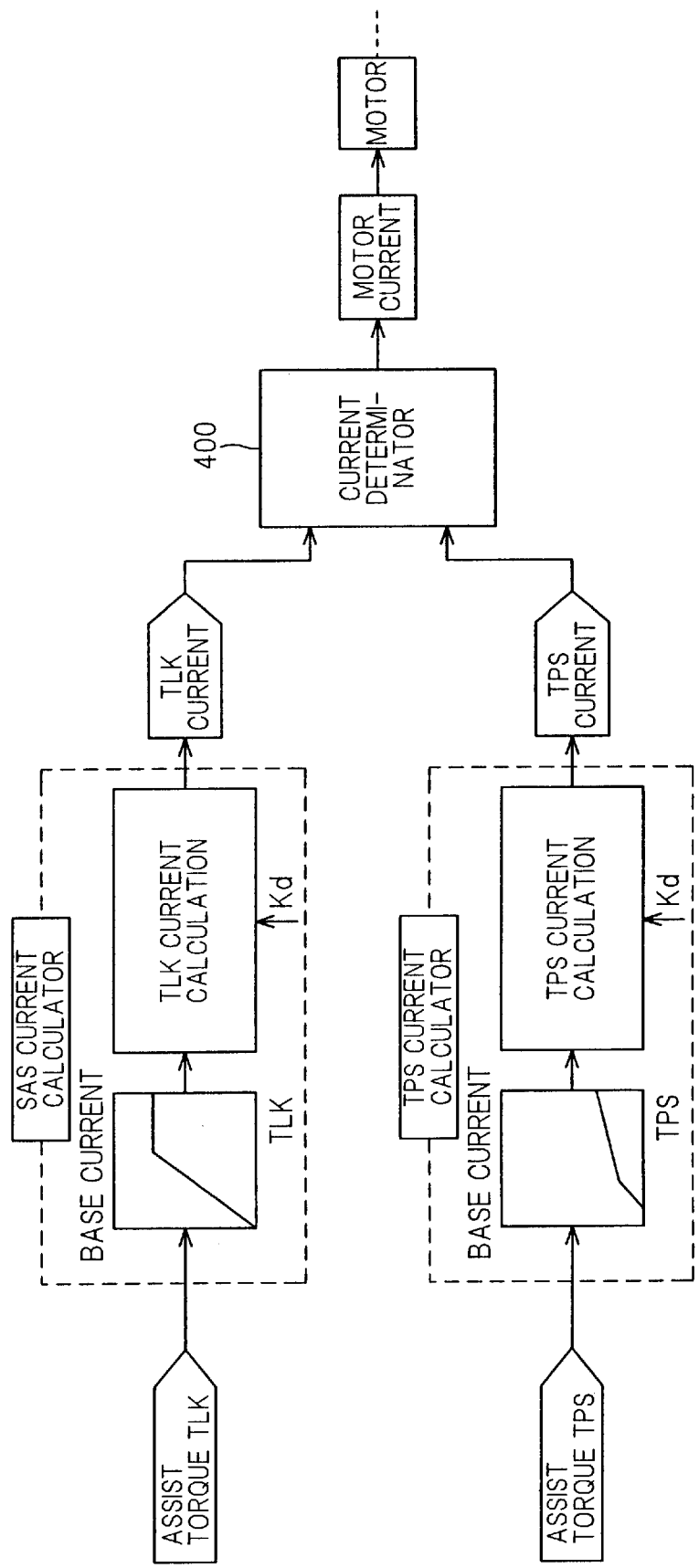
FIG. 11 is a view, similar to FIG. 7, but showing the operation of the vehicle steering control system according to a fourth embodiment of the present invention.

FIG. 11 is a view, similar to FIG. 7, but showing the configuration of the vehicle steering control system according to a fourth embodiment of the present invention.

The system according to the fourth embodiment has an SAS current calculator, a TPS current calculator and a current determinator 400. Specifically, the assist torque TLK is determined using the characteristic shown in FIG. 8 mentioned in the first embodiment, while the assist torque TPS is calculated using the characteristic shown by the solid line in FIG. 8. Based on the determined torques TLK, TPS, the SAS current calculator and TPS current calculator, calculate the base currents, correct the same using the dumping-correction factor Kd and determine current values (shown as "TLK current" or "TPS current"). The TLK current and the TPS current thus calculated are inputted to the current determinator 400 which determines the motor current to be supplied to the electric motor 38 based on these values of current.

Figure 12:
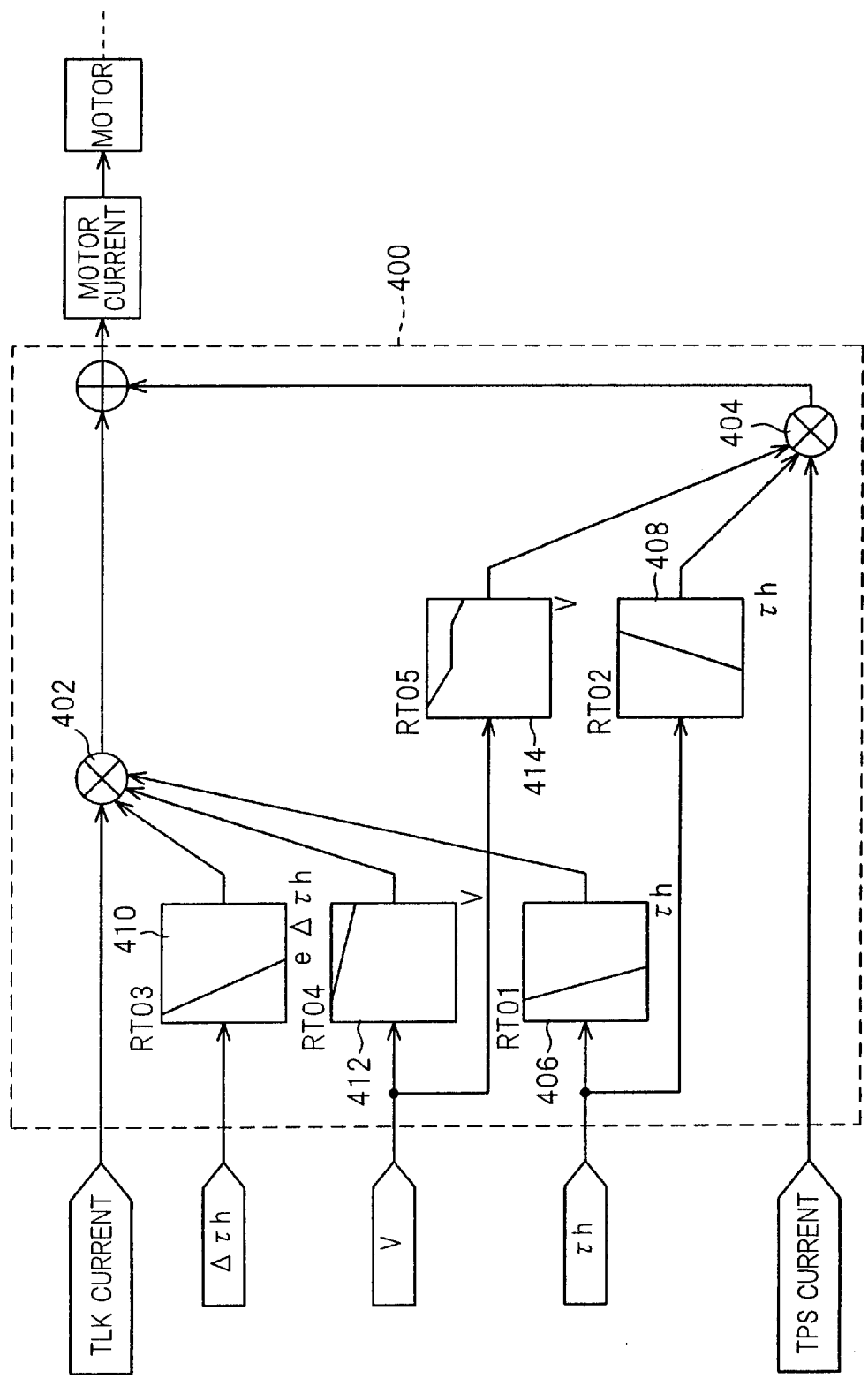
FIG. 12 is a block diagram showing the configuration of a current determinator in detail illustrated in FIG. 11.

FIG. 12 is a block diagram showing the configuration of the current determinator 400 in detail.

Explaining this, in addition to the ratios RTO1 and RTO2 used in the first embodiment, three kinds of ratios RTO3, RTO4 and RTO5 are prepared in the fourth embodiment such that they are determined in accordance with characteristics 410, 412, 414 illustrated there.

Specifically, as the correction for the assist torque TLK, the ratio RTO3 is determined relative to the detected torque change $\Delta\tau h$ (same as the change in detected torque referred to in the first embodiment (which indicates of steer velocity) obtained by calculating the 1st-order differential or difference of detected torque $\tau h$) in accordance with the characteristic 410, and the ratio RTO4 is determined relative to the vehicle speed V in accordance with the characteristic 412.

The TLK current calculated by the SAS current calculator is corrected by being multiplied with the three ratios RTO3, 4, and 1 at a multiplication point 402. The ratio RTO1 is determined using a characteristic 406 which is identical to the characteristic 100 referred to in the first embodiment. And, as the correction for the assist torque TPS, the ratio RTO5 is determined relative to the vehicle speed V in accordance with the characteristic 414. The TPS current calculated by the TPS current calculator is corrected by being multiplied with the two ratios RTO5, 2 at a multiplication point 404. The ratio RTO2 is determined using a characteristic 408 which is identical to the characteristic 102 referred to in the first embodiment.

The characteristic 410 relative to the detected torque change $\Delta\tau h$ for determining the ratio RTO3 is set as shown in the figure. Explaining this, the dumping-correction factor Kd is used in the first to fourth embodiments to determine the motor current so as to avoid adversely affecting the vehicle driver's perception of vehicle steering response, and furthermore to improve the vehicle driver's perception of how the vehicle steering is responding. Disadvantageously, however, this arrangement may sometimes generate the inertia force which constrains the vehicle driver's steering. With this, although this arrangement can avoid adversely affecting the vehicle driver's perception of vehicle steering response, it is insufficient in further enhancing the vehicle driver's perception of vehicle steering response.

In view of this problem, the ratio RTO3 is additionally determined relative to the detected torque change $\Delta\tau h$ and the characteristic 410 for determining the ratio is configured such that the ratio decreases with increasing detected torque change (i.e., steer velocity) $\Delta\tau h$ and becomes zero at a point e. With this, since the assist torque TLK decreases with increasing steer velocity and becomes zero if the steer velocity is greater than a value corresponding to the point e, the vehicle driver can enjoy a better feeling of steering without being constrained when he moves the steering wheel 14 speedily.

As regards the ratio RTO4 set relative to the vehicle speed V, the characteristic 412 for determining this ratio is set to be gradually decreased with increasing vehicle speed V, since the tire-road-interface friction coefficient decreases with increasing vehicle speed. As regards the other ratio RTO5 for the assist torque TPS similarly set relative to the vehicle speed V, the characteristic 414 for determining this ratio is configured as illustrated, such that the vehicle driver perceives the steering to be smooth at every vehicle speed.

Having been configured in the foregoing manner in the fourth embodiment, the vehicle driver's steering remains unconstrained, ensuring that the vehicle driver's perception of vehicle steering response is not adversely affected and giving a more comfortable feeling of steering.

The first to fourth embodiments are thus configured to have a system for controlling steering of a vehicle (10), including: an actuator (electric motor 38) which steers driven wheels (32) of the vehicle (10); 1st assist torque calculating means (SAS ECU 74) for calculating a first assist torque (TLK) for causing the vehicle to run along a reference line of a road existing ahead of the vehicle; steering torque detecting means (torque sensor 42) for detecting a steering torque ($\tau h$) inputted by a vehicle driver of the vehicle; 2nd assist torque calculating means (EPS ECU 76) for calculating a 2nd assist torque (TPS) for assisting vehicle driver's steering of the vehicle in accordance with a predetermined characteristic (illustrated in FIG. 8) based on the detected steering torque ($\tau h$); and manipulated variable calculating means (EPS ECU 74) for calculating a manipulated variable (TA) to be supplied to the actuator based on the calculated 1st and 2nd assist torques (TLK, TPS). The system includes: assist torque correcting means (EPS ECU 76) for correcting the calculated 1st and 2nd assist torques (TLK, TPS) based on at least the detected steering torque ($\tau h$); and the manipulated variable calculating means (EPS ECU 76) calculates the manipulated variable (TA) based on the corrected 1st and 2nd assist torques.

With this, if the power-steering torque assist control is carried out when the lane-keeping-steering torque assist control is in progress, the two kinds of assist torques can be distributed, preventing the two kinds of control from interfering with each other, therefore avoiding any adverse effect upon the vehicle driver's perception of vehicle steering response.

In the system, the assist torque correcting means determines correction coefficients (RTO1, RTO2) based on the detected steering torque ($\tau h$), and corrects the calculated 1st and 2nd assist torques by multiplying with the correction coefficients. Specifically, the assist torque correcting means determines correction coefficients (RTO1, RTO2) based on the detected steering torque ($\tau h$) in accordance with two characteristics (100, 102) which are predetermined complementary with each other, and corrects the calculated 1st and 2nd assist torques by multiplying with the correction coefficients respectively.

With this, if the power-steering torque assist control is carried out when the lane-keeping-steering torque assist control is in progress, the two kinds of assist torques can be distributed effectively, preventing the two kinds of control from interfering with each other, therefore avoiding any adverse effect upon the vehicle driver's perception of vehicle steering response.

In the system, the assist torque correcting means includes: steering torque change determining means (torque sensor 42, EPS ECU 76) for determining a change of the steering torque ($\Delta \tau h$); and wherein the assist torque correcting means corrects one of the calculated 1st and 2nd assist torques based on at least the determined change of the steering torque. Specifically, the assist torque correcting means determines a correction coefficient (RTO3) based on the determined change of steering torque ($\Delta \tau h$), and corrects the one of the calculated 1st and 2nd assist torques by multiplying with the correction coefficient.

With this, the vehicle driver can enjoy a better feeling of steering without being constrained by the inertia force due to the dumping-correction factor when he moves the steering wheel 14 speedily, and if the power-steering torque assist control is carried out when the lane-keeping-steering torque assist control is in progress, the two kinds of assist torques can be distributed effectively, preventing the two kinds of control from interfering with each other, therefore avoiding any adverse effect upon the vehicle driver's perception of vehicle steering response.

In the system, the assist torque correcting means includes: vehicle speed detecting means (wheel speed sensors 46, 50) for detecting a speed of the vehicle (V); and wherein the assist torque correcting means corrects the calculated 1st and 2nd assist torques based on at least the detected vehicle speed. Specifically, the assist torque correcting means determines correction coefficients (RTO4, RTO5) based on the detected vehicle speed (V), and corrects the calculated 1st and 2nd assist torques by multiplying with the correction coefficients.

With this, if the power-steering torque assist control is carried out when the lane-keeping-steering torque assist control is in progress, the two kinds of assist torques can be distributed effectively, preventing the two kinds of control from interfering with each other, therefore avoiding any adverse effect upon the vehicle driver's perception of vehicle steering response, and enabling the vehicle driver to perceive the steering to be smooth at every vehicle speed irrespective of the change in the tire-road-interface friction coefficient.

In the system, the predetermined characteristics, comprising a first characteristic portion (A) and a second characteristic portion (B) each set relative to the detected steering torque such that, for a given change in detected steering torque ($\Delta \tau h$), an amount of the 2nd assist torque calculated in accordance with the second characteristic portion, is less than that calculated in accordance with the first characteristic portion.

With this, since the steering is made light when the detected torque is relatively small, while the steering is made heavier with increasing detected torque, this better matches the vehicle driver's perception of how the vehicle ought to respond, and if the power-steering torque assist control is carried out when the lane-keeping-steering torque assist control is in progress, the two kinds of assist torques can be distributed effectively, preventing the two kinds of control from interfering with each other, therefore avoiding any adverse effect upon the vehicle driver's perception of vehicle steering response.

The system further includes: torque comparing means (EPS ECU 76, switch 202) for comparing the detected torque ($\tau h$) with a predetermined value (X); and wherein the assist torque correcting means corrects the calculated 1st and 2nd assist torques (TLK, TPS) based on the detected steering torque when the detected torque is less than or equal to the predetermined value, while correcting the calculated 2nd assist torque (TPS) when the detected torque is greater than the predetermined value, as mentioned with reference to FIG. 9.

The system further includes: torque comparing means (EPS ECU 76, switch 300) for comparing the detected torque (τh) with a predetermined value (X); and wherein, when the detected torque is less than or equal to the predetermined value, the assist torque correcting means corrects the calculated 1st assist torque (TLK) based on the detected steering torque, while when the detected torque is greater than the predetermined value correcting the calculated 2nd assist torque (TPS), as mentioned with reference to FIG. 10.

It should be noted in the above that the configurations described with reference to the first to fourth embodiments are examples and the invention should not be limited to this disclosure. For example, in the first embodiment, in addition to the detected torque, the detected torque change may be used. Alternatively, in the first to three embodiments, the correction by ratio may be made after the motor current has been calculated. In the fourth embodiment, the assist torques TLK, TPS may first be subject to the ratio correction.

It should further be noted that, although the ratio is defined as a multiplication factor in the first to fourth embodiments, it may be an additive factor if the assist torques TLK, TPS can appropriately be determined.

It should further be noted that, although the first to fourth embodiments are configured such that the EPS ECU 76 determines or calculates the power-steering assist torque TPS, the SAS ECU 74 may instead conduct this determination or calculation.

It should further be noted that, the steering angle sensor 44 and other sensors may be differently configured from that described in the foregoing and their locations are limited only by the need to provide the required values.

Although the invention has thus been shown and described with reference to specific embodiments, it should be noted that the invention is in no way limited to the details of the described arrangements but changes and modifications may be made without departing from the scope of the invention which is defined by the appended claims.

What is claimed is:

1. A system for controlling steering of a vehicle, including:
    an actuator which steers driven wheels of the vehicle;
    1st assist torque calculating means for calculating a first assist torque for causing the vehicle to run along a reference line of a road existing ahead of the vehicle;
    steering torque detecting means for detecting a steering torque inputted by a vehicle driver of the vehicle;
    2nd assist torque calculating means for calculating a 2nd assist torque for assisting vehicle driver's steering of the vehicle in accordance with a predetermined characteristic based on the detected steering torque;
    manipulated variable calculating means for calculating a manipulated variable to be supplied to the actuator based on the calculated 1st and 2nd assist torques; and
    assist torque correcting means for correcting the calculated 1st and 2nd assist torques based on at least the detected steering torque; and wherein
    the manipulated variable calculating means for calculating a manipulated variable to be supplied to the actuator based on the corrected 1st and 2nd assist torques.

2. A system according to claim 1, wherein the assist torque correcting means determines correction coefficients based on the detected steering torque, and corrects the calculated 1st and 2nd assist torques by multiplying with the correction coefficients.

3. A system according to claim 2, wherein the assist torque correcting means determines correction coefficients based on the detected steering torque in accordance with two characteristics which are predetermined complementary with each other, and corrects the calculated 1st and 2nd assist torques by multiplying with the correction coefficients respectively.

4. A system according to claim 1, wherein the assist torque correcting means includes:
    steering torque change determining means for determining a change of the steering torque; and
    wherein the assist torque correcting means corrects one of the calculated 1st and 2nd assist torques based on at least the determined change of the steering torque.

5. A system according to claim 4, wherein the assist torque correcting means determines a correction coefficient based on the determined change of steering torque, and corrects the one of the calculated 1st and 2nd assist torques by multiplying with the correction coefficient.

6. A system according to claim 1, wherein the assist torque correcting means includes:
    vehicle speed detecting means for detecting a speed of the vehicle; and
    wherein the assist torque correcting means corrects the calculated 1st and 2nd assist torques based on at least the detected vehicle speed.

7. A system according to claim 6, wherein the assist torque correcting means determines correction coefficients based on the detected vehicle speed, and corrects the calculated 1st and 2nd assist torques by multiplying with the correction coefficients.

8. A system according to claim 1, wherein the predetermined characteristics, comprising a first characteristic portion and a second characteristic portion each set relative to the detected steering torque such that, for a given change in detected steering torque, an amount of the 2nd assist torque calculated in accordance with the second characteristic portion, is less than that calculated in accordance with the first characteristic portion.

9. A system according to claim 1, further including:
    torque comparing means for comparing the detected torque with a predetermined value; and
    wherein the assist torque correcting means corrects the calculated 1st and 2nd assist torques based on the detected steering torque when the detected torque is less than or equal to the predetermined value, while correcting the calculated 2nd assist torque when the detected torque is greater than the predetermined value.

10. A system according to claim 1, further including:
    torque comparing means for comparing the detected torque with a predetermined value; and
    wherein, when the detected torque is less than or equal to the predetermined value, the assist torque correcting means corrects the calculated 1st assist torque based on the detected steering torque, while when the detected torque is greater than the predetermined value correcting the calculated 2nd assist torque.

* * * * *